United States Patent Office 2,916,493
Patented Dec. 8, 1959

2,916,493
DIOXOLANE DERIVATIVES

Robert Michel Jacob, Ablon-sur-Seine, and Nicole Marie Joseph, Paris, France, assignors to Societe des Usines Chimiques Rhone-Poulenc, Paris, France, a corporation of France No Drawing. Application January 27, 1958
Serial No. 711,149

Claims priority, application France February 26, 1957

7 Claims. (Cl. 260—293.2)

This invention relates to new dioxolane derivatives and a process for their preparation.

According to the present invention there are provided new 2-piperidyl-dioxolane compounds of the general formula:

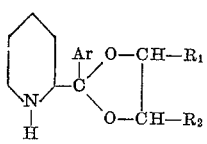

I (wherein Ar represents a phenyl group, and $R_1$ and $R_2$ are the same or different and represent hydrogen atoms or alkyl groups containing not more than four carbon atoms) and acid addition salts thereof.

According to a feature of the present invention the said 2-piperidyl-dioxolanes are obtained by reduction of the corresponding 2-pyridyl-dioxolanes of the general formula:

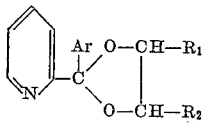

II wherein the various symbols are as hereinbefore defined. The reduction is preferably effected by means of hydrogen in the presence of a suitable hydrogenation catalyst such as Adams' platinum and is advantageously carried out at normal temperature and pressure.

The new 2-piperidyl-dioxolanes of the present invention possess remarkable pharmacodynamic properties; in particular, they are powerful stimulants of the central nervous system, exhibiting antagonistic activity with respect to the action of barbiturates (such as pentobarbital) and of morphine. For therapeutic purposes, the bases of general Formula I are preferably employed in the form of acid addition salts containing anions which are relatively innocuous to the animal organism in therapeutic doses of the salts (such as hydrochlorides and other hydrohalides, phosphates, nitrates, sulphates, maleates, fumarates, citrates, tartrates, oxalates, methanesulphonates and ethane-disulphonates) so that the beneficial physiological properties inherent in the bases are not vitiated by side-effects ascribable to the anions.

The following examples, in which the melting points indicated were determined on the Kofler bench, unless otherwise stated, illustrate the invention.

Example I 2-phenyl-2-(2-pyridyl)-1:3-dioxolane (78 g.) in acetic acid (780 cc.) is agitated in an atmosphere of hydrogen at about 20–25° C. in the presence of previously reduced Adams' platinum (7.8 g.). After filtering off the catalyst and washing with acetic acid, the filtrate is evaporated in vacuo. The residue is poured little by little into 17% sodium hydroxide (700 cc.) with stirring, the temperature being kept below 20° C.

2-phenyl-2-(2-piperidyl)-1:3-dioxolane crystallises and after filtration, washing and drying (77.5 g. obtained) it melts at 79° C. One recrystallisation from heptane does not alter the melting point.

To obtain the hydrochloride, hydrochloric acid ($d=1.19$; 7.5 cc.) is added to a solution of 2-phenyl-2-(2-piperidyl)-1:3-dioxolane (20 g.) in acetone (200 cc.). 2 - phenyl - 2 - (2 - piperidyl) - 1:3 - dioxolane hydrochloride (21.5 g.), M.P. 265–266° C. (micro Kofler), is obtained.

The 2-phenyl-2-(2-pyridyl)-1:3-dioxolane used as starting material (M.P. 112° C.) may be prepared by reacting ethylene glycol with 2-benzoyl-pyridine, for example, by heating the reagents at 100° C. in the presence of sulphuric acid or by azeotropic distillation in the presence of benzene and toluene-p-sulphonic acid.

Example II

Proceeding as in Example I but starting with 2-phenyl-2-(2-pyridyl)-4:5-dimethyl-1:3-dioxolane (10 g.), 2-phenyl - 2 - (2 - piperidyl) - 4:5 - dimethyl - 1:3 - dioxolane (10 g.) is obtained, the picrate of which melts at 165° C. and the hydrochloride at 261–262° C. (micro Kofler).

The 2-phenyl-2-(2-pyperidyl)-4:5-dimethyl-1:3-dioxolane (M.P. 108° C.) used as starting material may be obtained by reacting butane-2:3-diol with 2-benzoyl-pyridine in the presence of sulphuric acid or toluene-p-sulphonic acid.

We claim:

1. As a new substance a 2-piperidyl-dioxolane of the general formula:

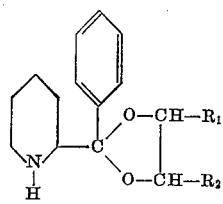

wherein $R_1$ and $R_2$ are each members of the class consisting of hydrogen atoms and lower alkyl groups.

2. As a new substance an acid addition salt of the compound of claim 1 which contains a pharmaceutically acceptable anion.

3. As a new substance, 2-phenyl-2-(2-piperidyl)-1:3-dioxolane.

4. As a new substance, 2-phenyl-2-(2-piperidyl)-4:5-dimethyl-1:3-dioxolane.

5. A process for the preparation of new 2-piperidyl-dioxolanes which comprises the reduction of 2-pyridyl-dioxolanes of the general formula:

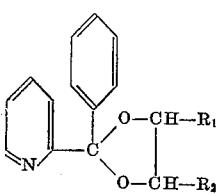

wherein $R_1$ and $R_2$ are each members of the class consisting of hydrogen atoms and lower alkyl groups by means of hydrogen in the presence of Adam's platinum catalyst and at normal temperature and pressure.

6. An acid addition salt of the compound defined in claim 3 which contains a pharmaceutically acceptable anion.

7. An acid addition salt of the compound defined in claim 4 which contains a pharmaceutically acceptable anion.

References Cited in the file of this patent

UNITED STATES PATENTS 2,830,988 Scheffler _____ Apr. 15, 1958